United States Patent [19]

Tanaka et al.

[11] Patent Number: 5,684,775
[45] Date of Patent: Nov. 4, 1997

[54] DISK APPARATUS IN WHICH PROTECTION AGAINST DISCHARGING OF STATIC ELECTRICITY IS TAKEN

[75] Inventors: Masasi Tanaka, Higashimurayama; Susumu Niinuma, Fujimi; Yo Kamei, Kokubunji, all of Japan

[73] Assignee: Teac Corporation, Tokyo, Japan

[21] Appl. No.: 574,119

[22] Filed: Dec. 18, 1995

[30] Foreign Application Priority Data

Dec. 19, 1994 [JP] Japan .................. 6-315314

[51] Int. Cl.$^6$ .................. G11B 33/02
[52] U.S. Cl. .................. 369/75.1; 369/75.2
[58] Field of Search .................. 369/75.1–77.2; 360/96.5, 99.02, 99.03, 99.06, 99.07, 137

[56] References Cited

U.S. PATENT DOCUMENTS

| | | | |
|---|---|---|---|
| 4,607,301 | 8/1986 | Iizuka | 360/93 |
| 4,700,338 | 10/1987 | Sugihara et al. | 369/77.1 |
| 4,847,711 | 7/1989 | Inoue | 360/96.5 |
| 4,864,458 | 9/1989 | Demorat, Jr. et al. | 361/212 |
| 4,912,580 | 3/1990 | Hanson | 360/98.01 |
| 5,229,897 | 7/1993 | Kimula et al. | 360/96.5 |
| 5,372,264 | 12/1994 | Rudi et al. | 211/41 |
| 5,475,548 | 12/1995 | Rudi et al. | 360/96.5 |

FOREIGN PATENT DOCUMENTS

| | | |
|---|---|---|
| 3-27359 | 6/1991 | Japan . |
| 3-200643 | 9/1991 | Japan . |
| 4-325985 | 11/1992 | Japan . |

Primary Examiner—Stuart S. Levy
Assistant Examiner—William J. Klimowicz
Attorney, Agent, or Firm—Michael N. Meller

[57] ABSTRACT

A disk apparatus includes a metallic chassis unit including a portion being grounded. A movable unit is provided to be movable relative to the chassis unit between an inserted position and a pulled-out position, the movable unit including an optical disk and electric parts for reproducing a signal indicative of information from the optical disk, the movable unit being included in the chassis unit when the movable unit is moved to the inserted position, and being pulled out from the chassis unit when the movable unit is moved to the pulled-out position. A conductive member is provided in the movable unit to protect the electric parts against a discharging of static electricity, the conductive member being electrically connected to the chassis unit when the movable unit is at the inserted position, the electric connection allowing a flow of a discharging current between an operator and the grounded portion of the chassis unit, and the conductive member being separated from the chassis unit when the movable unit is at the pulled-out position.

8 Claims, 8 Drawing Sheets

DISK APPARATUS IN WHICH PROTECTION AGAINST DISCHARGING OF STATIC ELECTRICITY IS TAKEN

BACKGROUND OF THE INVENTION

(1) Field of the Invention

The present invention generally relates to a disk apparatus, and more particularly to a disk apparatus for use in a computer system, wherein a movable unit carrying an optical disk such as a CD-ROM (compact disk read only memory) is inserted into or pulled out from a chassis unit.

(2) Description of the Related Art

A CD-ROM disk apparatus includes a chassis unit and a movable disk tray which is inserted into or pulled out from the chassis unit. If electric parts such as a disk rotating motor and an optical pickup are arranged in the chassis unit, the height of the chassis unit becomes great. It is difficult to design a disk apparatus with a small size if the disk apparatus includes the chassis unit in which the electric parts are arranged.

FIG. 1 shows a conventional CD-ROM disk apparatus 10 in which a protection against a discharging of static electricity is taken.

Referring to FIG. 1, the CD-ROM disk apparatus 10 includes a chassis unit 11 and a disk tray 12 which is inserted into or pulled out from the chassis unit 11. In the CD-ROM disk apparatus 10, the electric parts such as the disk rotating motor and the optical pickup are arranged in the disk tray 12. The chassis unit 11 is a hollow element for accommodating the disk tray 12, and the height of the chassis unit 11 can easily be reduced.

The disk apparatus of the above type is desirable because such a disk apparatus is helpful to design a disk apparatus having a smaller size.

However, when a finger 17 of an operator pushes an eject button 14 of the CD-ROM disk apparatus 10, a discharging of static electricity may take place to the disk apparatus 10 due to the charge of the operator. If an excessive amount of the discharging current due to the static electricity flows through the electric parts in the disk tray 12, the electric parts will be damaged.

Accordingly, it is desirable to take the protection against the discharging of static electricity for a disk apparatus in which the electric parts are arranged in the disk tray.

In the disk apparatus 10, shown in FIG. 1, the chassis unit 11 has a portion being grounded. The disk apparatus 10 with such a chassis unit 11 is incorporated in a computer system.

The chassis unit 11 is made of a metallic material, and the disk tray 12 is made of a synthetic resin. The disk tray 12 includes a front bezel 13, the eject button 14 provided at a portion of the front bezel 13, and a printed circuit board 15 provided adjacent to a back surface of the front bezel 13. A switch 16 is arranged on the printed circuit board 15 adjacent to the eject button 14.

The disk tray 12 is provided to be movable relative to the chassis unit 11 between an inserted position and a pulled-out position within the disk apparatus 10. Usually, the disk tray 12 is at the inserted position, and the disk tray 12 is included in the chassis unit 11. The inserted position of the disk tray 12 is indicated by a solid line in FIG.1.

In order to set a CD-ROM (compact disk read only memory) disk in the disk apparatus 10, the eject button 14 is pushed by the finger 17 of the operator, and the disk tray 12 is pulled out from the chassis unit 11 in the direction X2.

When the eject button 14 is pushed, the switch 16 is turned ON. The ON-state of the switch 16 makes a plunger solenoid be temporarily operated to unlock the disk tray 12 which was locked by a tray locking mechanism.

In the disk apparatus 10, shown in FIG. 1, the protection against the discharging of static electricity is taken by using a metal plate 20 and a flexible cable 21. The metal plate 20 is attached to the back surface of the front bezel 13 so as to partially cover the back surface of the front bezel 13. One end of the flexible cable 21 is connected to the bottom of the metal plate 20, and the other end of the flexible cable 21 is grounded via the bottom 11a of the chassis unit 11. The flexible cable 21 is bent in a U shape, and it is accommodated in a space 22 provided between the disk tray 12 and the bottom 11a of the chassis unit 11.

Accordingly, the metal plate 20 is grounded via the chassis unit 11 and the flexible cable 12. When the eject button 14 is pushed by the finger 17 of the operator, a discharging of static electricity between the finger 17 and the metal plate 20 via an opening 13a of the front bezel 13 may take place due to the charge of the operator as indicated by a reference numeral 26. If the discharging of static electricity occurs, the discharging current from the metal plate 20 escapes to the ground through the chassis unit 11 and the flexible cable 21. Hence, the discharging current does not reach the printed circuit board 15, and it is possible to protect the electric parts such as the optical pickup in the disk tray 12 from the discharging current.

The above disk apparatus 10 uses the flexible cable 21 to take the protection against the discharging of static electricity. For this reason, the following problems arise with the disk apparatus 10.

The disk apparatus 10 requires the space 22 in the chassis unit 11 below the disk tray 12 to include the flexible cable 21. It is difficult that the height of the disk apparatus 10 is reduced to a smaller height.

The flexible cable 21 in the disk apparatus 10 has a certain resistance to electric current. It is difficult that the discharging current due to the static electricity smoothly escapes from the disk apparatus 10 to the ground through the flexible cable 21.

The flexible cable 21 in the disk apparatus 10 is attached to the back surface of the front bezel 13 via the metal plate 20. This is inconvenient to the operator when inserting the disk tray 12 into and pulling out the same from the chassis unit 11 because the operating force of the operator is increased by the weight of the flexible cable 12.

In addition, the flexible cable 21 in the disk apparatus 10 is always attached to the front bezel 13 with no regard to whether the disk tray 12 is at the inserted position or at the pulled-out position. A friction between the bottom 11a of the chassis unit 11 and the flexible cable 21 is likely to take place when the disk tray 12 is inserted into or pulled out from the chassis unit 11. If the friction takes place, a noise detrimental to reproduction of information from an optical disk will be produced.

SUMMARY OF THE INVENTION

An object of the present invention is to provide an improved disk apparatus in which the above-described problems are eliminated.

Another object of the present invention is to provide a disk apparatus in which an effective protection against the discharging of static electricity is taken without arising problems detrimental to an operation of the disk apparatus.

Still another object of the present invention is to provide a disk apparatus which is useful to design a disk apparatus having a reduced height in order to reduce a size of a computer system in which the disk apparatus is incorporated.

The above-mentioned object of the present invention is achieved by an optical disk apparatus which includes a metallic chassis unit including a portion being grounded, a movable unit which is movable relative to the chassis unit between an inserted position and a pulled-out position, the movable unit including an optical disk and electric parts for reproducing a signal indicative of information from the optical disk, the movable unit being included in the chassis unit when the movable unit is moved to the inserted position, and being pulled out from the chassis unit when the movable unit is moved to the pulled-out position, and a conductive member, provided in the movable unit to protect the electric parts against a discharging of static electricity, the conductive member being electrically connected to the chassis unit when the movable unit is at the inserted position, the electric connection allowing a flow of a discharging current between an operator and the grounded portion of the chassis unit, and the conductive member being separated from the chassis unit when the movable unit is at the pulled-out position.

In the disk apparatus of the present invention, the conductive member is connected to the grounded portion of the chassis unit only when the movable unit is at the inserted position. The disk apparatus of the present invention does not require a flexible cable to electrically connect the conductive member to the chassis unit. This makes it possible to provide a disk apparatus having a reduced height with a low cost.

The flexible cable having a certain resistance used by the conventional disk apparatus need not be used by the disk apparatus of the present invention to connect the conductive member to the chassis unit. The discharging current due to the static electricity easily escapes from the disk apparatus to the ground via the conductive member having a small resistance. Therefore, an effective protection against the discharging of static electricity can be taken in the disk apparatus of the present invention.

The disk apparatus of the present invention makes it possible to reduce the operating force of the operator when inserting the movable unit into or pulling out the movable unit from the chassis unit.

The disk apparatus of the present invention makes it possible to prevent the noise detrimental to the operations of the disk apparatus from being produced due to the friction between the flexible cable and the chassis unit when inserting the movable unit into or pulling out the movable unit from the chassis unit.

BRIEF DESCRIPTION OF THE DRAWINGS

The above and other objects, features and advantages of the present invention will become more apparent from the following detailed description when read in conjunction with the accompanying drawings in which.

DESCRIPTION OF THE PREFERRED EMBODIMENTS

A description will now be given of a preferred embodiment of the present invention with reference to the accompanying drawings.

Figure 2:
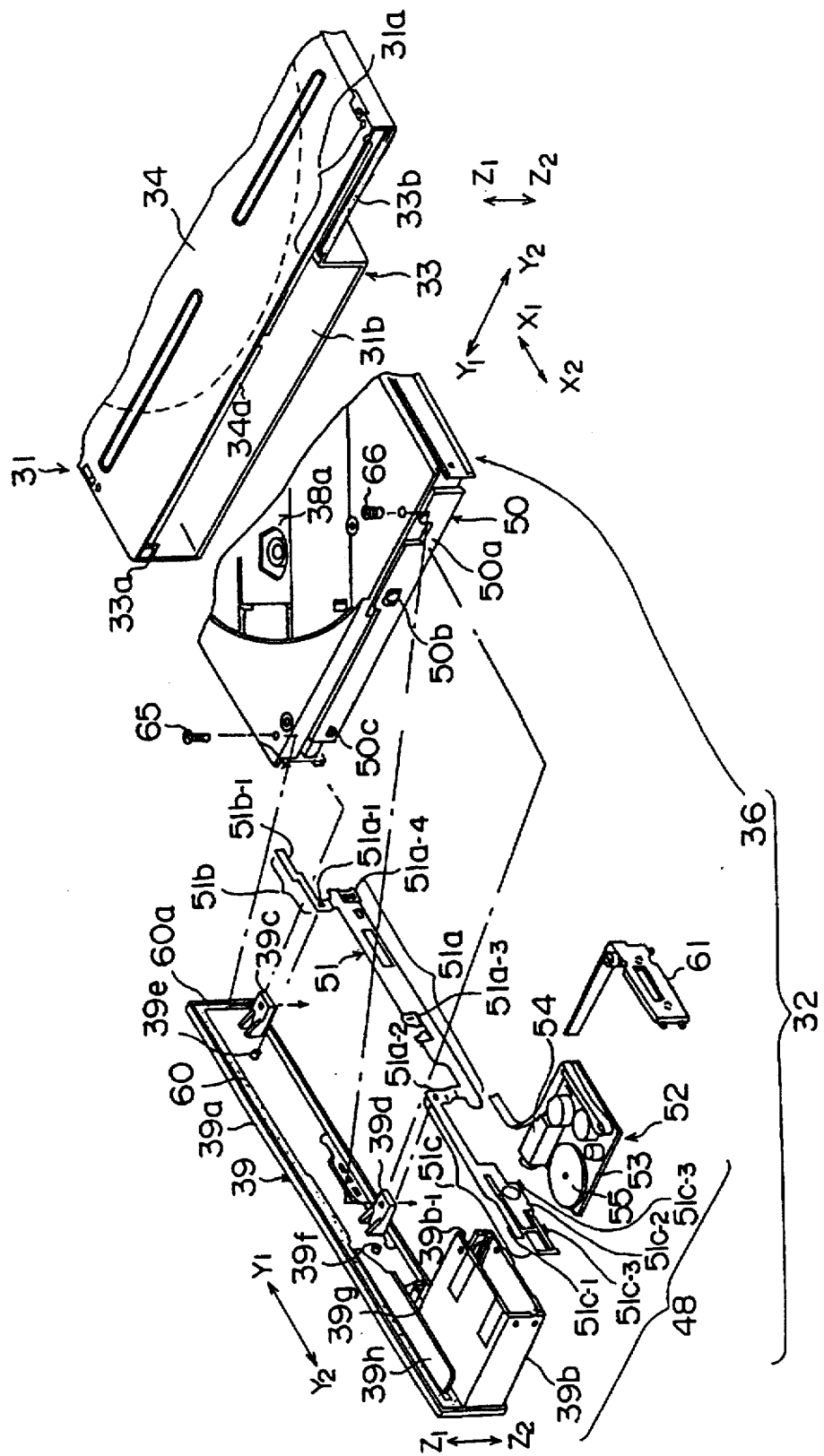
FIG. 2 is an exploded view of a disk apparatus in one embodiment of the present invention.
Figure 3:
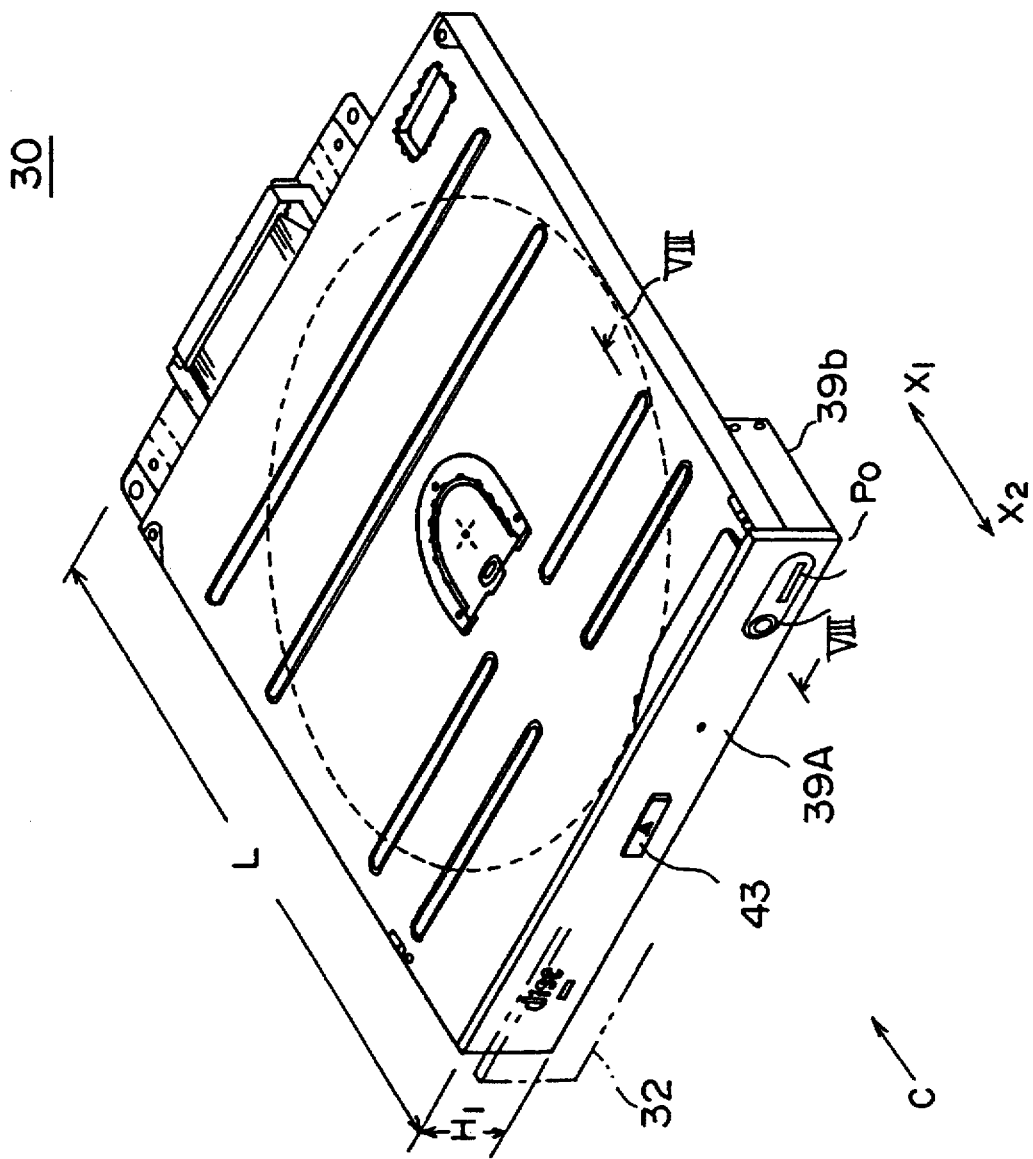
FIG. 3 is a perspective view of the disk apparatus when a movable unit is inserted.
Figure 5A:
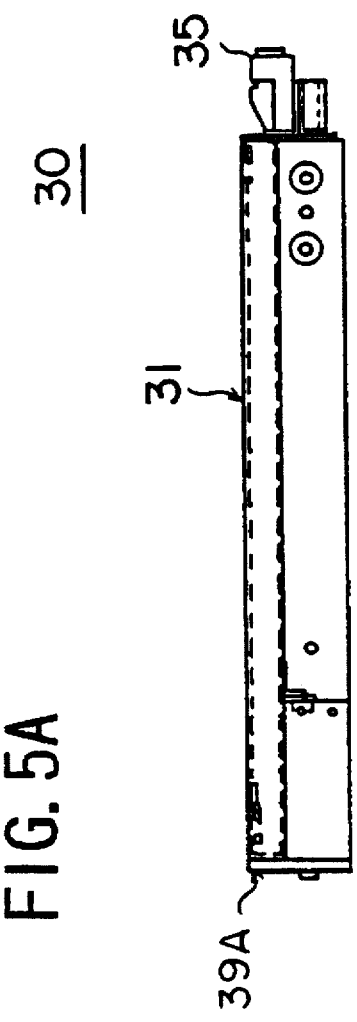
FIG. 5A is a side view of the disk apparatus in FIG. 3.

FIG. 2 shows a disk apparatus 30 in the preferred embodiment of the present invention. FIG. 3 shows the disk apparatus 30 when a movable unit is inserted. FIG. 5A is a side view of the disk apparatus 30 in FIG. 3. The disk apparatus 30, shown in FIGS. 3 and 5A, is in a stop mode or in a play mode.

Figure 4:
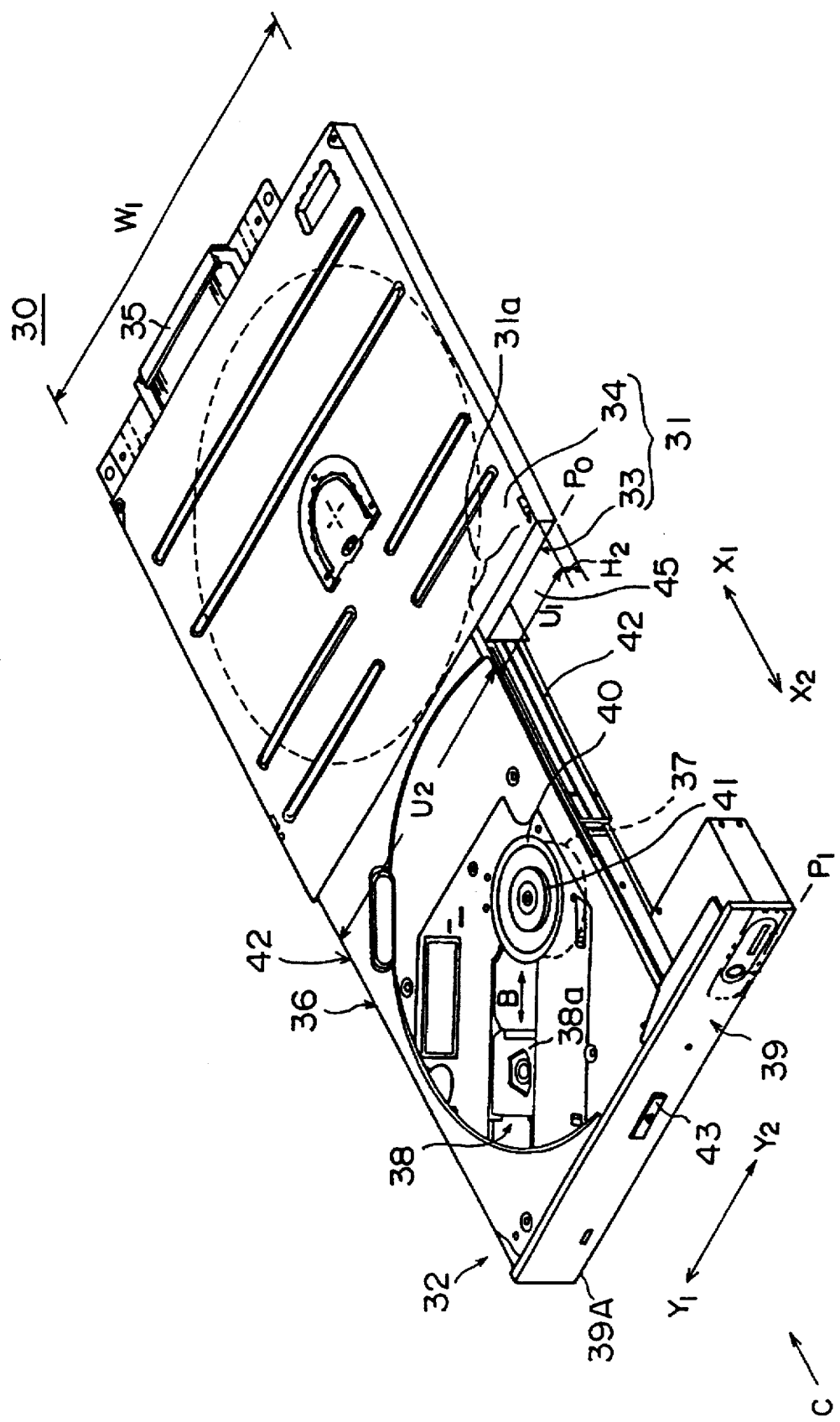
FIG. 4 is a perspective view of the disk apparatus when the movable unit is pulled out.
Figure 5B:
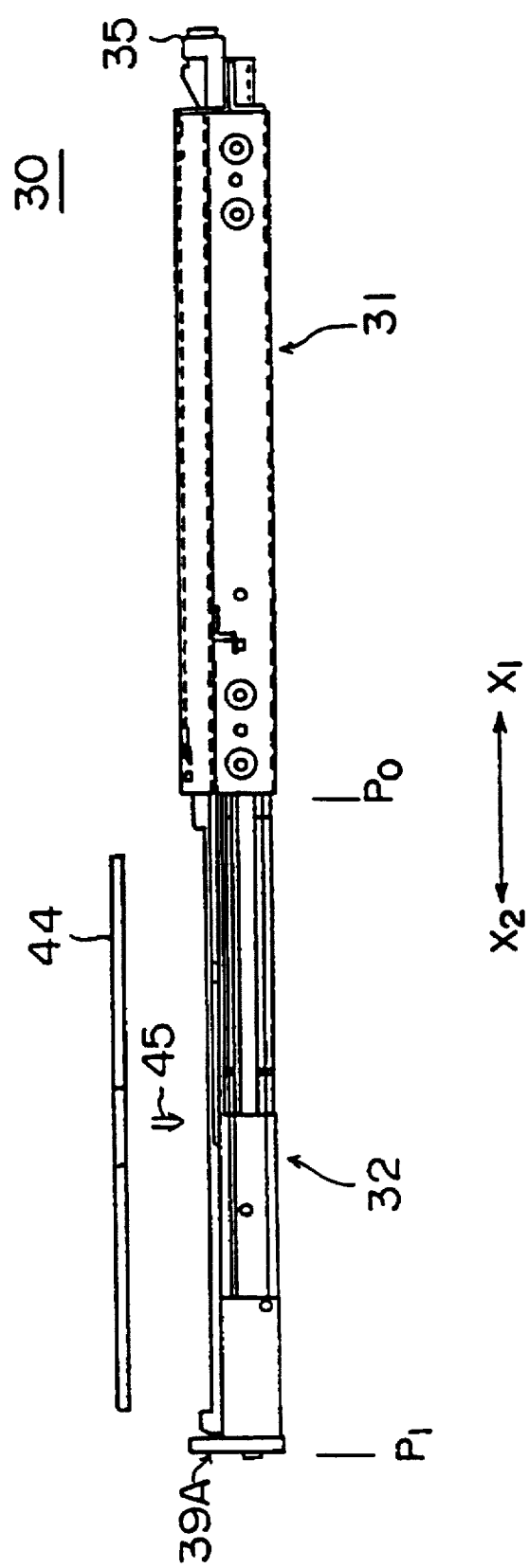
FIG. 5B is a side view of the disk apparatus in FIG. 4.

FIG. 4 shows the disk apparatus 30 when the movable unit is pulled out. FIG. 5B is a side view of the disk apparatus 30 in FIG. 4. The disk apparatus 30, shown in FIGS. 4 and 5B, is in a condition before a CD-ROM 44 is attached to or removed from the disk apparatus 30.

The disk apparatus 30 generally includes a chassis unit 31 and a movable unit 32. The disk apparatus 30 is attached to and incorporated in a computer system (not shown). The disk apparatus 30 when it is incorporated in the computer system includes a connector 35 which is disposed at a rear end of the disk apparatus 30, and the apparatus 30 is electrically connected to the computer system via the connector 35.

The chassis unit 31 includes a chassis body 33 made of a sheet metal, and a cover plate 34 made of a sheet metal. The chassis unit 31 has a box-like shape.

The movable unit 32 is made of a synthetic resin. The movable unit 32 includes a body portion 36. In the movable unit 32, a disk rotating motor 37, an optical pickup 38 and a front bezel 39 are secured to the body portion 36.

The disk rotating motor 37 has a rotating shaft to which a turn table 40 is fixed. The turn table 39 includes a clamp unit 41 which is provided to clamp the CD-ROM 44 on the turn table 39. The optical pickup 38 includes a pickup element 38a which is provided to be movable relative to the CD-ROM 44 in radial directions indicated by the arrows B in FIG. 4.

The front bezel 39 has a front surface 39A. An eject button 43 is disposed at the center of the front surface 39A.

The body portion 36 includes guide rails 42 on both sides of the body portion 36, and the movable unit 32 is slidably supported by the guide rails 42 to the chassis unit 31. Thus, the movable unit 32 is provided within the disk apparatus 30 to be movable relative to the chassis unit 31 between an inserted position "P0" (which is indicated in FIG. 5A) and a pulled-out position "P1" (which is indicated in FIG. 5B) in inserting and pulling-out directions indicated by the arrows X1 and X2 in FIGS. 3 and 4.

When the disk apparatus 30 is in the stop mode, as shown in FIGS. 3 and 5A, the movable unit 32 is at the inserted position P0, and the movable unit 32 is locked at the rear end. The movable unit 32 at this time is included in the chassis unit 31, as shown in FIG. 5A. There is no CD-ROM on the movable unit 32 in the disk apparatus 30.

In order to set the disk apparatus 30 in the play mode, it is necessary for an operator (not shown) to pull out the movable unit 32 from the disk apparatus 30 and place the CD-ROM 44 on the movable unit 32. The operator pushes the eject button 43 at the center of the front bezel 39.

The movable unit 32 is unlocked by this operation of the operator, and the movable unit 32 is slightly moved in the direction X2 relative to the chassis unit 31. The movable unit 32 is then at a position indicated by a two-dot chain line in FIG. 3.

After this movement of the movable unit 32, the operator manually pulls out the movable unit 32 from the disk apparatus 30 further in the direction X2 to the pulled-out position P1.

Accordingly, the movable unit 32 is placed at the pulled-out position P1 shown in FIGS. 4 and 5B. As indicated by the arrow 45 in FIG. 5B, the operator places the CD-ROM 44 on the movable unit 32 so that the CD-ROM 44 is fitted to the turn table 40 and held thereon by the clamp unit 41.

After the setting of the CD-ROM 44 on the turn table 40, the operator pushes the front surface 39A of the front bezel 39 to move the movable unit 32 in the direction X1, so that the movable unit 32 returns back to the inserted position P0.

When the movable unit 32 is moved to the inserted position P0, the movable unit 32 is again locked. The disk apparatus 30 at this time is in the condition shown in FIGS. 3 and 5A. The CD-ROM 44 on the movable unit 32 is included in the chassis unit 31.

When the disk apparatus 30 is in the play mode, the disk rotating motor 37 is operated to rotate the CD-ROM 44 on the turn table 40. The optical pickup 38 is operated to reproduce a signal indicative of information from the CD-ROM 44. The signal from the optical pickup 38 is transmitted to the computer system through the connector 35.

In order to remove the CD-ROM 44 from the disk apparatus 30, it is necessary for the operator to perform an operation which is similar to the above-described setting of the CD-ROM 44. That is, the operator pushes the eject button at the center of the front bezel 39 to unlock the movable unit 32 and move the movable unit 32 slightly in the direction X2 relative to the chassis unit 31. The operator then manually pulls out the movable unit 32 from the disk apparatus 30 further in the direction X2 to the pulled-out position P1. When the movable unit 32 is at the pulled-out position P1, the CD-ROM 44 can easily be removed from the disk apparatus 30.

Referring to FIG. 4, in the disk apparatus 30, the front bezel 39 is not disposed to the chassis unit 31, but it is disposed to the movable unit 32. As shown in FIG. 4, the body portion 36 of the movable unit 32 has a width "U2" which is smaller than a width "W1" of the disk apparatus 30 by a width difference "U1" (="W1"–"U2"). The movable unit 32 has an asymmetrical shape with respect to the rotating shaft of the disk rotating motor 37, and is located toward the left side of the disk apparatus 30.

As shown in FIG. 4, a height "H2" of a right side portion 31a (corresponding to the width difference "U1") of the chassis unit 31 is smaller than a height "H1" of a left side portion (corresponding to the width "U2" of the body portion 36) of the chassis unit 31 in which the movable unit 32 is included. The bottom of the right-side portion 31a is raised from the bottom of the left-side portion (the body portion 36) of the chassis unit 31.

Accordingly, the disk apparatus 30 has an open space 45 which is located below the bottom of the right-side portion 31a. This space 45 has the width "U1" and the height (="H1"–"H2"), and the space 45 has a length that is the same as the length "L" of the chassis unit 31. The space 45 includes no parts of the disk apparatus 30, and the size of the disk apparatus 30 can be reduced. That is, a volume of the disk apparatus 30 is smaller than a volume of a rectangular block having the width W1, the height H1 and the length L by a volume of the space 45.

When the disk apparatus 30 of the present embodiment is incorporated in the computer system, some parts of the computer system can be disposed in the above-mentioned space 45 of the disk apparatus 30. Therefore, it is possible to reduce the size of the computer system in which the disk apparatus 30 of the present embodiment is incorporated.

Figure 7A:
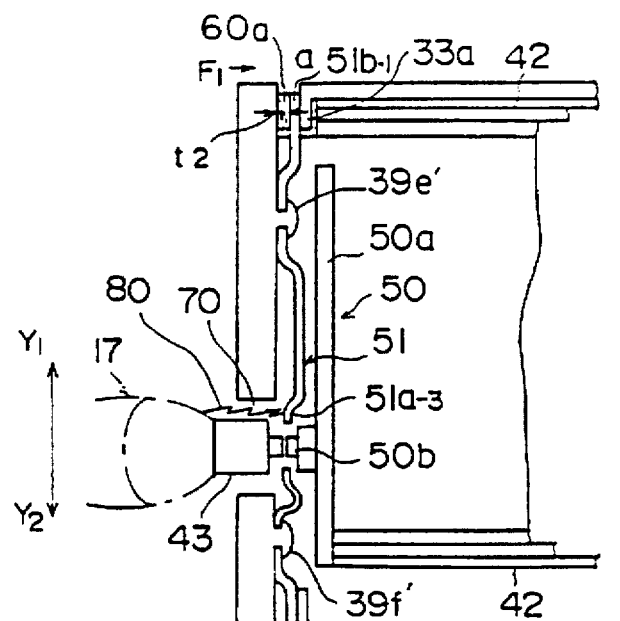
FIGS. 7A and 7B are enlarged top views of a portion of the disk apparatus in FIG. 3 and in FIG. 4.

Referring to FIGS. 2 and 7A, a sheet-metal member 51 is provided on the rear surface of the front bezel 39 to protect the disk apparatus from a discharging of static electricity which may be produced by the charge of the operator. When the movable unit 32 is at the inserted position P0, the sheet-metal member 51 is brought into contact with the chassis unit 31. When the movable unit 32 is at the pulled-out position P1, the sheet-metal member 51 is separated from the chassis unit 31.

In the present embodiment, a front bezel unit 48 is secured to the front end of the body portion 36 of the movable unit 32.

In the front bezel unit 48, the front bezel 39 includes a front bezel body 39a, a case portion 39b, a pair of flange portions 39c and 39d, a pair of bosses 39e and 39f, a connecting portion 39g, and a rib 39h. The case portion 39b, the flange portions 39c and 39d, the bosses 39e and 39f, the connecting portion 39g, and the rib 39h extend from a rear surface of the front bezel body 39a. The front bezel body 39a is a slender, rectangular sheet.

The movable unit 32 includes a printed circuit board unit 50 at a front end portion of the movable unit 32. The printed circuit board unit 50 includes a printed circuit board 50a with a printed circuit pattern, a switch 50b and a light emitting diode (LED) 50c. The switch 50b and the LED 50c are packaged with the printed circuit board 50a.

The sheet-metal member 51 in the present embodiment is made of a conductive sheet-metal material. Referring to FIG. 2, the sheet-metal member 51 is provided within the movable unit 32. The sheet-metal member 51 includes a body portion 51a, a first arm portion 51b extending from one end of the body portion 51a in the direction Y1, and a second arm portion 51c extending from the other end of the body portion 51a in the direction Y2.

The body portion 51a includes a locating hole 51a-1 at one end thereof and a locating hole 51a-2 at the other end thereof. The body portion 51a further includes a switch covering part 51a-3 at the center of the body portion 51a, and an LED covering part 51a-4 near the locating hole 51a-1. The switch covering part 51a-3 is 10 provided to cover the switch 50b of the printed circuit board unit 50. The switch covering part 51a-3 has a pair of bent legs which are formed at the center of the body portion 51a. The LED covering part 51a-4 is provided to cover the LED 50c of the printed circuit board unit 50. The LED covering part 51a-4 has an opening at which the LED 50c is located.

The first arm portion 51b has a contact part 51b-1 at a leading edge of the first arm portion 51b, and this contact part 51b-1 is connected to the chassis unit 31 when the movable unit 32 is at the inserted position P0.

The second arm portion 51c has a contact part 51c-1 at a leading edge of the second arm portion 51c and a headphone jack covering part 51c-2 at another leading edge of the second arm portion 51c. The headphone jack covering part 51c-2 is provided to cover a front surface of a headphone jack unit 52. The headphone jack covering part 51c-2 has a pair of bent legs 51c-3 which are formed in the second arm portion 51c.

The headphone jack unit 52 includes a circuit board 53, a headphone jack 54, and a volume control knob 55. The headphone jack 54 and the volume control knob 55 are disposed on the circuit board 53.

As previously described, the eject button 43 is disposed at the center of the front surface 39A of the front bezel 39 in the front bezel unit 48. On the back surface of the front bezel 39, there are provided a rubber sheet 60, the sheet-metal member 51, the headphone jack unit 52, and a lid member 61 in this order.

The rubber sheet 60 is indicated by a dot pattern in FIGS. 2 and 7A. The rubber sheet 60 has a generally rectangular shape, and is disposed at the peripheral portions of the front bezel body 39a. The rubber sheet 60 is attached to the back surface of the front bezel 39 by using an adhesive agent. The rubber sheet 60 is attached to provide an appropriate sealing for the disk apparatus 30.

Figure 6:
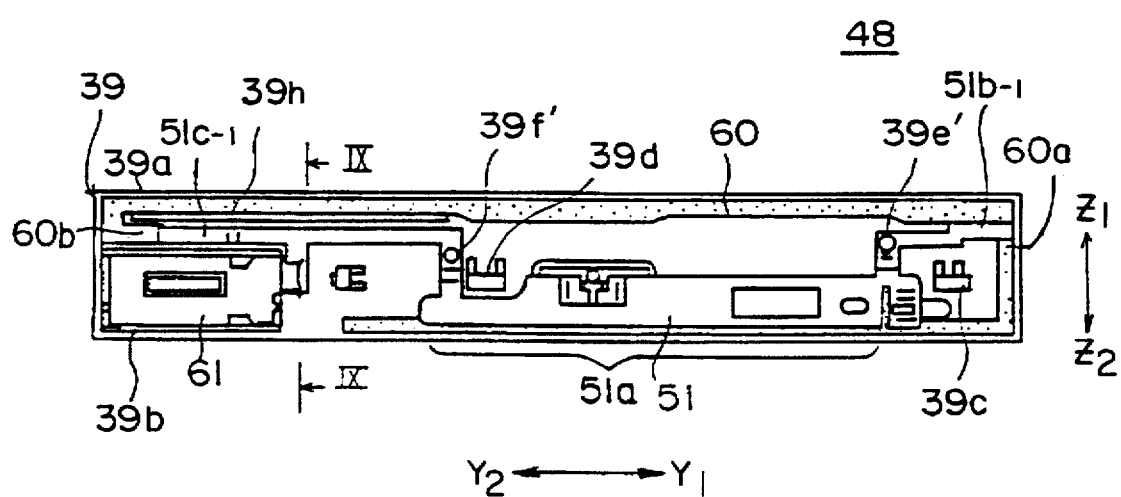
FIG. 6 is a rear view of a front bezel unit of the disk apparatus in FIG. 2.

FIG. 6 shows the back surface of the front bezel unit 48 of the disk apparatus in FIG. 2.

Referring to FIG. 6, the sheet-metal member 51 is located on the back surface of the front bezel 39 by fitting the locating holes 51a-1 and 51a-2 to the bosses 39e and 39f, respectively. After the locating of the sheet-metal member 51 on the front bezel 39 is performed, heads of the bosses 39e and 39f are fused by using a soldering iron or the like to fix the sheet-metal member 51 to the front bezel 39. The fused heads of the bosses 39e and 39f are indicated by reference numerals 39e' and 39f' in FIGS. 6, 7A and 7B.

The contact part 51b-1 of the sheet-metal member 51 is disposed at the left-side corner of the front bezel body 39a. When the movable unit 32 is moved to the inserted position P0, the contact part 51b-1 of the sheet-metal member 51 is brought into contact with a conductive portion 33a of the chassis body 33.

The rubber sheet 60 includes a vertically extending portion 60a, and this portion 60a is partially disposed at the left-side corner of the front bezel body 39a. Thus, when the movable unit 32 is moved to the inserted position P0, the portion 60a of the rubber sheet 60 resiliently presses the contact part 51b-1 of the sheet-metal member 51 against the conductive portion 33a of the chassis body 33. Accordingly, the contact part 51b-1 and the portion 60a make it possible to ensure an electrical connection between the sheet-metal member 51 and the chassis body 33.

The headphone jack covering part 51c-2 is passed through a cut-out part 39b-1 of the case portion 39b, and the covering part 51c-2 is disposed at a front surface of the case portion 39b.

The contact part 51c-1 of the sheet-metal member 51 is disposed near the right-side corner of the front bezel body 39a. The contact part 51c-1 is located between the case portion 39b and the rib 39h. When the movable unit 32 is moved to the inserted position P0, the contact part 51c-1 of the sheet-metal member 51 is brought into contact with a conductive portion 33b of the chassis body 33.

Figure 7B:
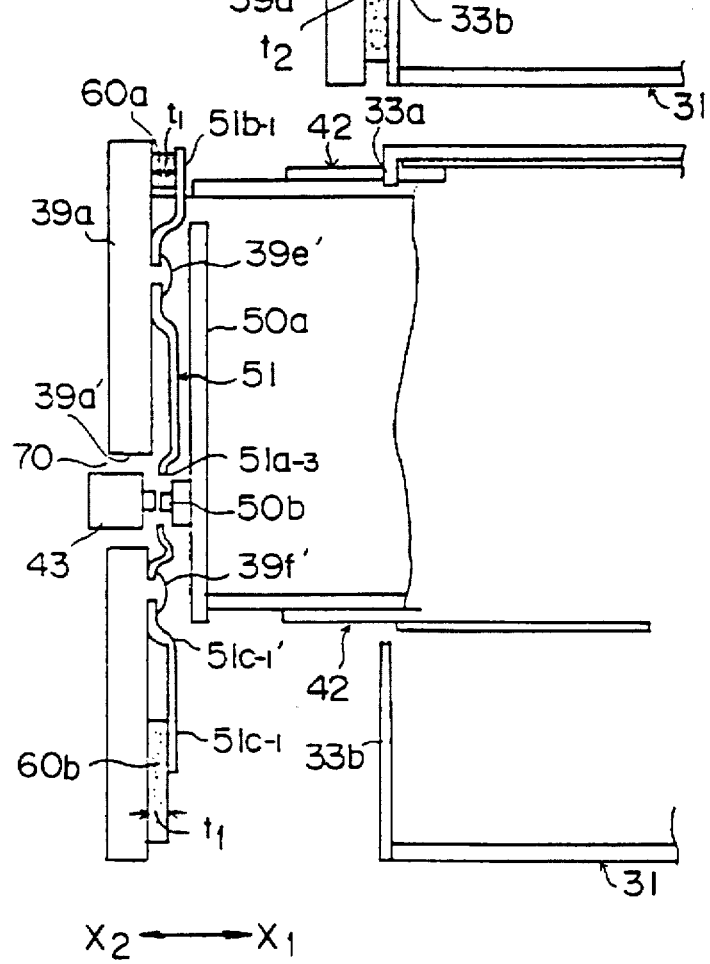

As shown in FIG. 7B, the body portion 51a of the sheet-metal member 51 is connected to the second arm portion 51c via a bent portion 51c-1'. The contact part 51c-1 is slightly spaced from the back surface of the front bezel 39 by the bent portion 51c-1'.

The rubber sheet 60 includes a portion 60b near the right-side corner of the front bezel body 39a. The portion 60b of the rubber sheet 60 is disposed between the case portion 39b and the rib 39h, as shown in FIG. 6. The portion 60b is interposed between the front bezel body 39a and the contact part 51c-1, as shown in FIG. 7B. Thus, when the movable unit 32 is moved to the inserted position P0, the portion 60b of the rubber sheet 60 resiliently presses the contact part 51c-1 of the sheet-metal member 51 against the conductive portion 33b of the chassis body 33. Accordingly, the contact part 51c-1 and the portion 60b make it possible to ensure an electrical connection between the sheet-metal member 51 and the chassis body 33.

Figure 8:
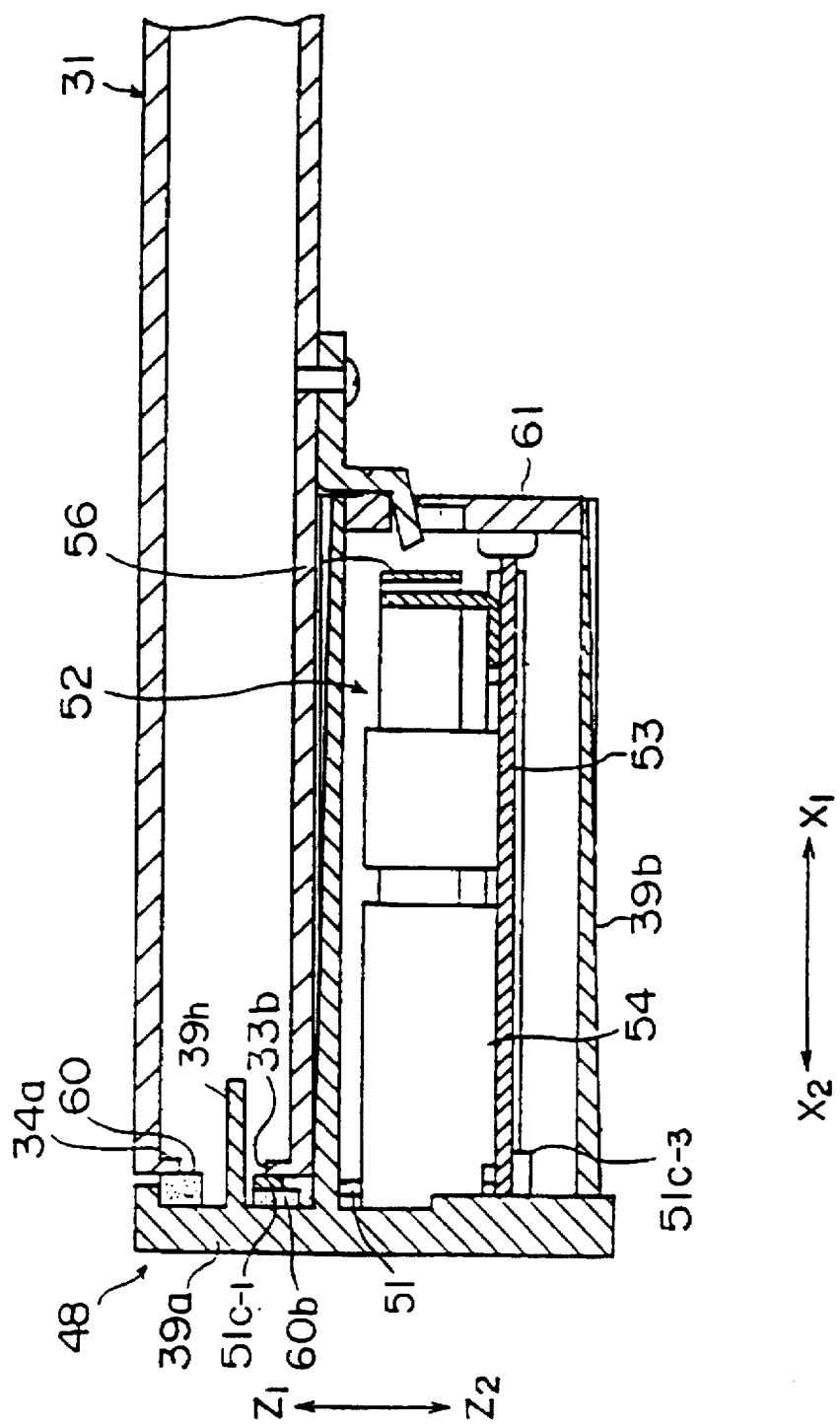
FIG. 8 is a cross-sectional view of the disk apparatus taken along a line VIII—VIII in FIG. 3.

Referring to FIG. 8, the headphone jack unit 52 is accommodated in the case portion 39b of the front bezel 39. The cut-out part 39b-1 of the case portion 39b is enclosed with the lid member 61.

The bent legs 51c-3 are connected to a grounding pattern (not shown) of the circuit board 53.

Figure 9:
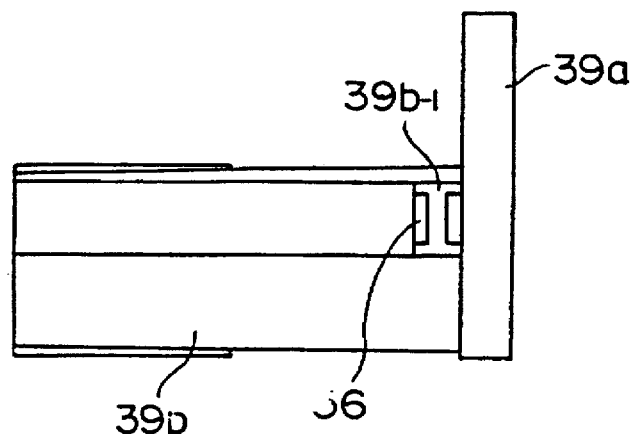
FIG. 9 is a cross-sectional view of the disk apparatus taken along a line IX—IX in FIG. 6.

FIG. 9 is a cross-sectional view of the disk apparatus 30 taken along a line IX—IX in FIG. 6.

Referring to FIG. 9, a flexible cable 56 is taken out from the cut-out part 39b-1 of the case portion 39b, and the flexible cable 56 is connected to the printed circuit board 50a.

The front bezel 39 is secured to the front end of the body portion 36 by attaching the flange portions 39c and 39d to the printed circuit board unit 50 by screws 65 and 66, respectively. Also, the connecting portion 39g of the front bezel 39 is fitted to a hole 36a of the body portion 36.

Referring to FIG. 2, the above-described front bezel unit 48 is secured to the body portion 36 of the movable unit 32, and the body portion 51a of the sheet-metal member 51 covers the front surface of the printed circuit board 50a. The switch 50b is covered with the switch covering portion 51a-3, and the LED 50c is covered with the LED covering portion 51a-4.

Referring to FIGS. 7A and 7B, the rear end of the eject button 43 is placed adjacent to the front end of the switch 50b. There is provided a space 70 between the eject button 43 and an opening 39a' of the front bezel body 39a. This space 70 is covered with the switch covering portion 51a-3 of the sheet-metal member 51.

Referring back to FIG. 2, the chassis body 33 includes the conductive portion 33a at the left-side upper corner in a front end opening 31b of the chassis unit 31. Also, the chassis body 33 includes the conductive portion 33b at the front end face of the right-side portion 31a of the chassis unit 31. The conductive portion 33b has a rectangular shape.

The conductive portions 33a and 33b are formed with flat surfaces and slightly project from the front end opening 31b of the chassis unit 31.

The cover plate 34 includes a bent portion 34a along the front edge of the cover plate 34. The bent portion 34a projects toward the front end opening 31b of the chassis unit 31.

Next, a description will be given of an operation of the disk apparatus 30 which is housed in the computer system.

The chassis unit 31 is grounded, and the chassis unit 31 in such a grounded condition is incorporated in the disk apparatus 30. The potential of the chassis unit 31 when the disk apparatus 30 is operated is at the grounded level.

When the disk apparatus 30 is in the stop mode, the movable unit 32 is at the inserted position P0 shown in FIG. 7A, and the movable unit 32 is locked there. The sheet-metal member 51 is brought into contact with the chassis body 33, and the left-side and right-side ends of the sheet-metal member 51 are electrically connected to the chassis body 33. More specifically, the contact part 51b-1 is connected to the conductive portion 33a, and the contact part 51c-1 is connected to the conductive portion 33b.

At this time, a discharging of static electricity may take place when the operator pushes the eject button 43 of the disk apparatus 30. As indicated by the arrow 80 in FIG. 7A, the discharging current may flow from the finger 17 of the operator to the sheet-metal member 51 via the space 70. The discharging current further flows from the sheet-metal member 51 to the chassis body 33 through the chassis unit 31, and it escapes to the grounding terminals of the computer system.

Accordingly, the electric parts such as the LED 50c in the printed circuit board unit 50 are protected by the sheet-metal member 51 from the discharging of static electricity. It is possible to prevent the LED 50c and any other parts in the printed circuit board unit 50 from being subjected to the discharging current due to the static electricity.

Next, a description will be given of the electric connection between the sheet-metal member 51 and the chassis unit 31 when the disk apparatus 30 is in the stop mode.

Referring to FIGS. 7A and 7B, the portion 60a of the rubber sheet 60 has a thickness t1 (FIG. 7B) when the rubber sheet 30 is not compressed, and when compressed the portion 60a has a thickness t2 (FIG. 7A) which is smaller than the thickness t1. Accordingly, when the movable unit 32 is at the inserted position P0 (FIG. 7A), the portion 60a of the rubber sheet 60 resiliently presses the contact part 51b-1 of the sheet-metal member 51 against the conductive portion 33a of the chassis body 33 by a resilient force "F1". The portion 60a and the contact part 51b-1 can ensure an electrical connection between the sheet-metal member 51 and the chassis body 33. The area of the electrical connection where the sheet-metal member 51 and the chassis body 33 are connected each other is relatively large.

Similarly to the portion 60a, the portion 60b of the rubber sheet 60 has the thickness t1 (FIG. 7B) when the rubber sheet 30 is not compressed, and when compressed the portion 60b has the thickness t2 (FIG. 7A) which is smaller than the thickness t2.

When the movable unit 32 is at the inserted position P0, the portion 60b of the rubber sheet 60 resiliently presses the contact part 51c-1 of the sheet-metal member 51 against the conductive portion 33b of the chassis body 33 by a resilient force "F2". The contact part 51c-1 and the portion 60b can ensure an electrical connection between the sheet-metal member 51 and the chassis body 33. The area of the electrical connection where the sheet-metal member 51 and the chassis body 33 are connected each other is relatively large.

As described above, the sheet-metal member 51 is electrically connected to the chassis body 33 at the two positions. Since the area of each of the electrical connections between the sheet-metal member 51 and the chassis body 33 is relatively large, the resistance of each of the electric connections is relatively small.

Figure 1:
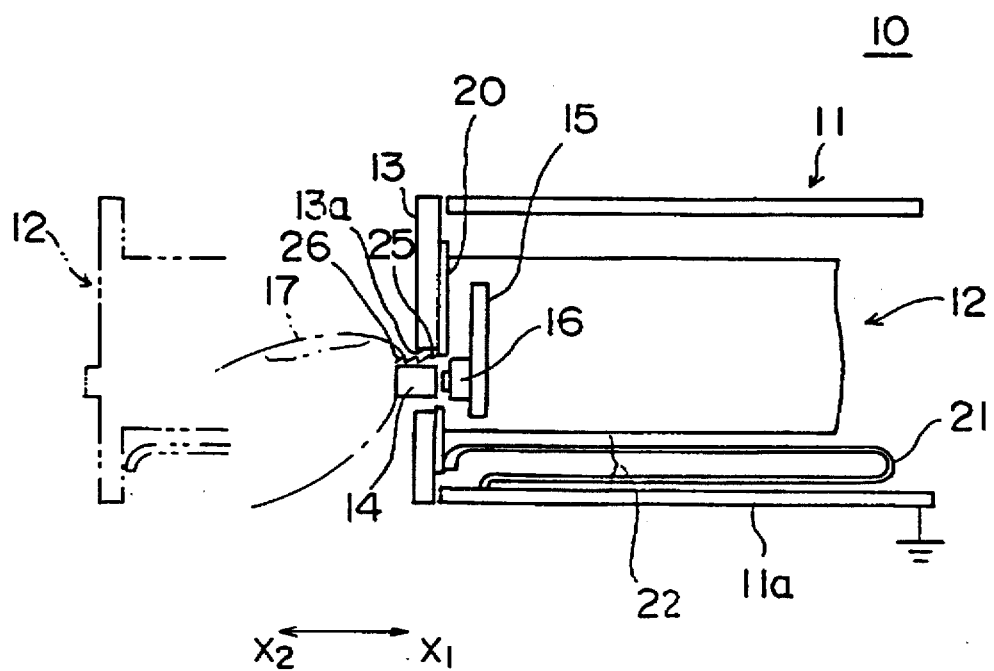
FIG. 1 is a diagram showing a conventional disk apparatus.

Accordingly, the discharging current due to the static electricity escapes from the disk apparatus 30 to the grounding terminals of the computer system more smoothly than that of the conventional disk apparatus of FIG. 1 in which the flexible cable 21 is used. Therefore, the disk apparatus 30 of the present invention provides a higher reliability than the conventional disk apparatus of FIG. 1.

When the movable unit 32 is pulled out from the chassis unit 31 by pushing the eject button 43 and is moved away from the inserted position P0, as shown in FIG. 7B, the contact parts 51b-1 and 51c-1 of the sheet-metal member 51 are separated from the conductive portions 33a and 33b of the chassis body 33. The sheet-metal member 51 is disconnected from the chassis unit 31, and if the discharging current due to the static electricity is produced it does not flow through the sheet-metal member 51. Accordingly, when the disk apparatus 30 is in this condition, the protection against the discharging of static electricity is canceled.

The discharging of static electricity takes place when the movable unit 32 is at the inserted position P0 and the operator touches the eject button 43 for the first time. Once the discharging of static electricity is produced by the charge of the operator, the discharging current due to the static electricity will not flow through the disk apparatus 30 again. Therefore, there is no problem with the disk apparatus 30 although the protection against the discharging of static electricity is canceled when the movable unit 32 is moved away from the inserted position P0.

Next, a description will be given of other advantageous features of the disk apparatus 30 of the present invention over the conventional disk apparatus 10 shown in FIG. 1.

The disk apparatus 30 of the present invention does not use the flexible cable 21 which is used by the conventional disk apparatus 10, and the disk apparatus 30 does not require the space 22 which must be provided in the conventional disk apparatus 10. Therefore, it is possible to reduce the whole height of the disk apparatus 30 by eliminating the space 22.

The disk apparatus 30 of the present invention does not use the flexible cable 21 which is used by the conventional disk apparatus 10, and the load to pull out the movable unit 32 from the chassis unit 31 is reduced. Therefore, the movable unit 32 can easily be inserted into and pulled out from the chassis unit 31 when the disk apparatus 30 is operated.

The disk apparatus 30 of the present invention does not require moving a flexible cable with the movable unit 32, and a noise due to the movement of the flexible cable is not produced with the disk apparatus 30. Therefore, the disk apparatus 30 does not produce a noise when the movable unit 32 is inserted or pulled out.

FIG. 8 is a cross-sectional view of the disk apparatus 30 taken along a line VIII—VIII in FIG. 3.

Referring to FIG. 8, when the movable unit 32 is at the inserted position P0, the rubber sheet 60 is pressed to the bent portion 34a of the cover plate 34 of the chassis unit 31. Therefore, it is possible for the disk apparatus 30 of the present invention to provide an adequate sealing for the inside of the chassis unit 31.

The disk apparatus 30 of the present invention does not use the flexible cable 21 or the screws to fix the sheet-metal member 51. In the disk apparatus 30, the sheet-metal member 51 is fixed to the front bezel 39 by fusing the heads of the bosses 39e and 39f with the soldering iron. Therefore, the disk apparatus 30 of the present invention can be produced with a low cost.

When a maintenance of the printed circuit board unit 50 in the disk apparatus 30 is carried out, it is not necessary to separate the sheet-metal member 51 from the front bezel 39.

In the disk apparatus 30 of the present invention, the front bezel unit 48 can be removed from the movable unit 32 by loosening the screws 65 and 66. Once the front bezel unit 48 is removed from the movable unit 32, the printed circuit board unit 50 is exposed and the maintenance of the printed circuit board unit 50 can easily be carried out.

In addition, it is a matter of course that the disk apparatus 30 of the present invention is applicable to a compact-disk (CD) apparatus and a magneto-optical (MO) disk apparatus.

Further, the present invention is not limited to the above-described embodiment, and variations and modifications may be made without departing from the scope of the present invention. For example, a sheet-metal member made of another conductive material may be used instead of the sheet-metal member 51 described above.

What is claimed is:

1. A disk apparatus comprising:

a chassis unit having a metallic portion being grounded;

a movable unit containing electric parts for reproducing a signal indicative of information from an optical disk, said optical disk being supported on said movable unit, said movable unit being movable relative to said chassis unit between an inserted position and a pulled-out position, said movable unit being enclosed in said chassis unit when said movable unit is moved to the inserted position, and being pulled out from said chassis unit when said movable unit is moved to the pulled-out position; and a conductive member provided within said movable unit and having a contact part which is engagable with said grounded portion of said chassis unit, said contact part being electrically connected to said grounded portion when said movable unit is located at the inserted position, said electric connection between the contact part of the conductive member and the grounded portion of the chassis unit allowing a flow of discharging current between an operator and said grounded portion and protecting said electric parts of the movable unit against a discharging of static electricity from the operator, and said contact part being electrically disconnected from said grounded portion when said movable unit is located at the pulled-out position.

2. The disk apparatus according to claim 1, wherein said conductive member is a sheet-metal member of a conductive sheet-metal material with which said contact part is integrally formed.

3. The disk apparatus according to claim 2, wherein said movable unit further includes a rubber sheet having a plurality of portions which resiliently press contact parts of said conductive member onto said grounded portion of said chassis unit when the movable unit is at the inserted position.

4. The disk apparatus according to claim 2, wherein said chassis unit includes a plurality of conductive portions to which said conductive member is electrically connected when the movable unit is at the inserted position, said conductive portions being connected to said grounded portion.

5. The disk apparatus according to claim 2, wherein said movable unit includes a front bezel secured to a front end of said movable unit, said front bezel including bosses on a back surface of the front bezel, and said conductive member being secured to said front bezel by fusing said bosses.

6. The disk apparatus according to claim 2, wherein said conductive member includes a covering portion which covers an eject button at a center of a front bezel, the discharging current due to the static electricity being produced when said eject button is manually pushed by the operator.

7. The disk apparatus according to claim 2, wherein said chassis unit includes a plurality of conductive portions, said conductive portions being connected to said grounded portion, and said movable unit includes a front bezel secured to a front end of said movable unit, and said conductive member includes a plurality of contact parts at corners of said front bezel, said contact parts of the conductive member being contacted with said conductive portions of the chassis unit when the movable unit is at the inserted position.

8. The disk apparatus according to claim 2, wherein said conductive member includes a plurality of contact parts which are brought into contact with the chassis unit when the movable unit is at the inserted position.

* * * * *